Figure 1:
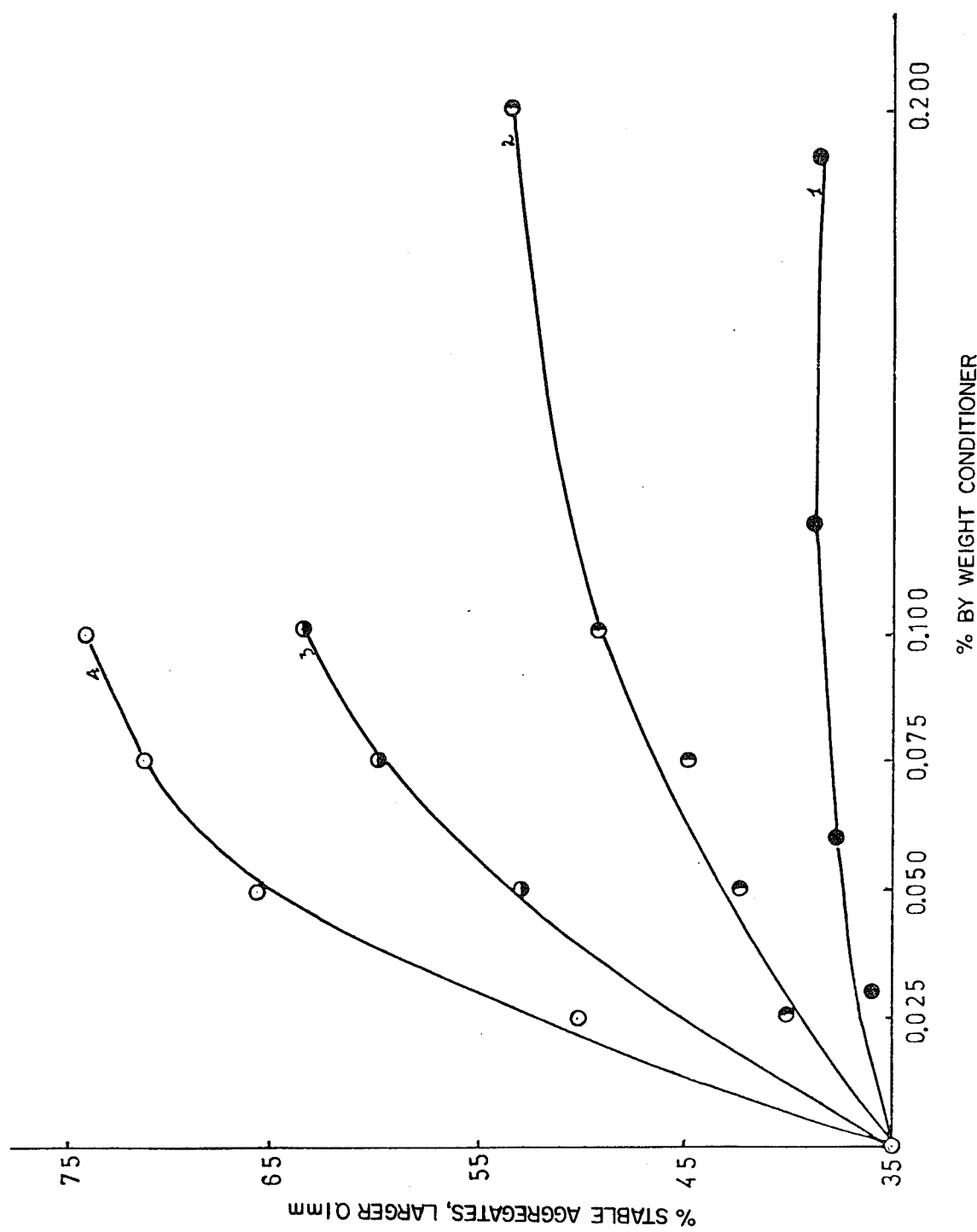

United States Patent [19]

Zaslavsky et al.

[11] 4,387,205
[45] Jun. 7, 1983

[54] METHOD FOR STABILIZATION OF SOIL AGGREGATES

[75] Inventors: Dan Zaslavsky; Leib V. Rozenberg, both of Haifa, Israel

[73] Assignee: Technion Research & Development Foundation, Ltd., Haifa, Israel

[21] Appl. No.: 303,153

[22] Filed: Sep. 17, 1981

Related U.S. Application Data

[60] Division of Ser. No. 953,799, Oct. 23, 1978, Pat. No. 4,303,438, which is a continuation-in-part of Ser. No. 748,367, Dec. 7, 1976, abandoned.

[30] Foreign Application Priority Data

Dec. 18, 1975 [IL]  Israel ..................................... 48686

[51] Int. Cl.$^3$ ............................................... C08H 5/02
[52] U.S. Cl. .................................................... 527/400
[58] Field of Search ......................................... 527/400

[56] References Cited

U.S. PATENT DOCUMENTS 3,985,659 10/1976 Felicetta et al. .................. 524/72 X
4,276,077  6/1981 Zaslavsky et al. .............. 527/400 X
4,303,438 12/1981 Zaslavsky et al. ................ 71/903 X

OTHER PUBLICATIONS

Vol'fkovich et al., "Improving Soil Structure", Chemical Abstracts 84, 73052n (1976).

Primary Examiner—Earl A. Nielsen
Attorney, Agent, or Firm—John S. Roberts, Jr.

[57] ABSTRACT

The present invention relates to a method for improving a soil structure by stabilization of aggregates. According to the invention it is applied to the soil a graft polymer substantially free of monomer, having an intrinsic viscosity below 1dg/l and a molecular weight below 100,000. The graft polymer is obtained by the exothermic reaction of a water soluble lignosulfonate with a member selected from the group consisting of acrylic acid, methacrylic acid and mixtures thereof. The graft polymers have been found to be also useful as binding reagents for agglomerating single particles of particulate materials.

The graft polymers according to the invention are obtained in the form of an aqueous solution, which may be transformed into a powder by spray drying. As soil conditioners they may be applied by spraying, alone or admixed with fertilizers or pesticides and also combined with the operation of planting and soil stabilization.

9 Claims, 3 Drawing Figures

METHOD FOR STABILIZATION OF SOIL AGGREGATES

This is a division of application Ser. No. 953,799, filed Oct. 23, 1978, now U.S. Pat. No. 4,303,438, issued Dec. 1, 1981, which is a continuation in part of Ser. No. 748,367 filed Dec. 7, 1976, now abandoned.

The present invention relates to new lignosulfonate-based graft polymers and to methods for their manufacture. The new graft polymers have been found to possess many practical uses. According to a main aspect of the present invention it has been found that the new graft polymers have outstanding beneficial effects on improving the soil structure, a property attributed to the so-called soil conditioners, giving rise to the formation of aggregates in the soil. According to another embodiment of the present invention the new graft polymers obtained have been found to possess the ability of agglomerating single particles of particulate materials into aggregates and thus changing the properties on the surface of these materials.

As known, the structure of a soil determines a large number of its properties such as permebility to water, porosity, crust formation, aeration etc. An improved structure will be beneficial for the prevention of erosion by water, increase in crop yields etc. It also simplifies the mechanical preparation of the field before planting. An increase in aggregate size and in percent of aggregates will reduce wind erosion. It will also induce a high penetration of rain into the soil and will improve water holding capacity and reduce evaporation, the result of which is a better water balance in arid zones. Of special importance is the prevention of crust formation due to puddling by rain drops. Prevention of this puddling, allows for a better rain infiltration into the soil and causes a reduction of run-off with a consequent erosion decrease. The crust prevention following puddling, improves germination and aeration of saplings.

It has been postulated that the differences in structure between the undesirable and the desirable types of soil are attributable to differences in the type of the electrical charges of the individual soil particles. Accordingly, it has been proposed to condition or to improve poor soils, for example structurally undesirable clayey and loam soils, by applying to them certain synthetic polyelectrolytes. These are mainly based on polyacrylamides, polymethyl-acrylonitriles, copolymers of acrylonitriles with vinyl acetate etc. Thus, for example U.S. Pat. No. 2,625,471 claims a copolymer containing 80-84% acrylonitrile, 11-15% methacrylonitrile and 5% vinyl acetate and hydrolysed in order to make it hydrophilic. U.S. Pat. No. 2,847,392 describes a copolymer containing 50% methacrylonitrile and 50% butadiene. U.S. Pat. No. 2,765,290 claims a modification of polymethylacrylonitrile; after hydrolysis to the acidic form, the polymer is absorbed on to the surface of vermiculite particles and used in this form as soil conditioner.

Although these polyelectrolytes have been used successfully in a number of limited applications, such as house gardening, they have not become widespread due to one or more of the following reasons:

(a) They are too expensive for large scale use.
(b) The strength of bonds holding the particles of soil in an aggregate, is too high and thus detrimental for certain properties.
(c) Very often they appear in a powder form, which causes problems in their storage and is very inefficient in field application.
(d) Some of them have toxic properties for animals and human beings.
(e) Some of them are easily decomposed by bacteria present in the soil.
(f) Some of them are not sufficiently stable even for a complete season being readily decomposable and washed out.

Some references are encountered describing the use of lignosulfonate as soil conditioner. Some improved results are claimed to be achieved in obtaining soil aggregates using amounts of about 2% or more by weight lignosulfonate. However, such relatively large amounts of lignosulfonate become expensive in application as well as in manipulation and also raise problems concerning the bacterial activities in the soil. The lignosulfonate is leached through the soil and thus is wasted to a large extent. It also penetrates to certain layers where it is not needed and may even be harmful and cause problems of contamination. Large amounts of lignosulfonate also tend to produce a massive rather than the friable aerated structure desirable in most soils for agricultural purposes. The lignosulfonates may become irreversibly disactivated by some multivalent cations and at the same time when applied in large amounts deprive the plants from some of the necessary micro-elements.

In according with the U.S. Pat. No. 3,985,659, a graft copolymer of lignosulfonate with polyacrylate having a molecular weight of at least 100,000 is utilized in drilling fluid compositions. For drilling muds, the requirement is to maintain the particles in suspension, and for this reason these fluids should have a proper viscosity in order to impart a thixotropic character to the system.

In a very recent publication, U.S.S.R. 492,261 (C.A. 84: 73052) a method is described for improving soil structure, by mixing the soil with a structure former which is a graft polymer produced from lignosulfonate with esters of acrylic acid and subsequently saponified to an extent of 30 to 100%. The products obtained appear in the form of a viscous mass and are utilized as aqueous dispersions. The inventors of the present invention have found that these graft polymers possess the property of a gel of thixotropic nature. One disadvantage of these graft polymers is the need for a saponification operation which adds to the process costs. Another disadvantage is their highly viscous form which requires a high dilution and consequently increases the costs of spray drying and transforming them into powder form.

It is an object of the present invention to provide new lignosulfonate-based graft polymers which possess outstanding properties in stabilization of aggregates. It is yet another object of the present invention to provide lignosulfonate-based graft polymers which have the property of improving the adhesion of single particles of particulate materials. The invention consists in a method for improving a soil structure by stabilization of aggregates which consists of applying a soil conditioner comprising a graft polymer substantially free of monomer, having an intrinsic viscosity below 1 dg/l and a molecular weight lower than 100,000, said polymer being obtained by the exothermic reaction of a water soluble lignosulfonate with a member selected from the group consisting of acrylic acid, methacrylic acid and mixtures thereof at a pH between 1.5 to 4 in the presence of an initiator. The ratio between the lignosulfonate and the acrylic acid or methacrylic acid may be varied over a broad range being generally up to 8 parts of lignosulfonate (parts by weight) to one part (by weight) of acrylic or methacrylic acid. The selection of the preferred ratio will be according to the specific end-use of the graft polymers.

According to one embodiment of the present invention, the new graft polymers have been found to possess outstanding properties for stabilizing aggregates. For this purpose the following main advantages can be enumerated:

(1) The new graft polymers are relatively inexpensive.
(2) Their manufacture is very simple.
(3) The amount of the relatively expensive acrylic or methacrylic acid component in the graft polymer may be small.
(4) They can be applied in a high aqueous concentration, in contrast to the relative low concentration of the acrylate esters-based graft polymers. This has a corresponding advantage in their transportation.

The graft copolymers according to the present invention are in particular very useful for agglomerating of clay having a particle size below 2 microns, or silt having a particle size below 20 microns. The aggregates which result have a size of above 100 microns and generally above a few hundreds of microns.

The preferred ratio between the components in the new graft polymer may vary between 0.4 part to 2 parts by weight acrylic acid or methacrylic acid to one part by weight lignosulfonate. The lower limit of the acrylic component is determined by the decreased efficiency of the soil conditioner versus the price of production and costs of field application. The higher limit is determined by the relation between the increased price of the graft polymer, due to the more expensive acrylic component, and the increased efficiency of the product. For special purposes, when the cost of the graft polymer is not critical and the needed strength for the specific goal is high, the amount of acrylic acid or methacrylic acid monomer may be increased. A person skilled in the art after reading the present specification will certainly be able to determine the proper ratio between lignosulfonate and acrylic acid or methacrylic acid in order to obtain the soil conditioner most suitable for the purpose required. Of course the higher acrylic or methacrylic acid component in the graft polymer results in a product with a higher molecular weight and stronger bonds with the soils thus obtaining larger and stronger aggregates. It is also possible to use a mixture of two or more graft polymers prepared separately with different ratios between lignosulfonate and acrylic or methacrylic acid monomers. In this manner each conditioner in the mixture will act on the soil according to its composition, for the specific goal. For example if the conditioner is to be sprayed, one may use a mixture of two types. One type would be of a higher molecular weight for stronger bonds at the surface, the other may be of a lower molecular weight to improve the penetration below the surface.

The term "crude lignosulfonate" as is used in the present specification, includes the waste material resulting from the processing of plants or wood for the separation of cellulose and lignosulfonic acid or salts thereof as obtained without any purification. The constitution of the crude lignosulfonate varies depending on the type of plant or wood utilized and on the method of processing; it appears generally in the form of $Na^+$, $NH_4^+$ or $Ca^{++}$ salts along with various polysaccharides, which for certain uses are harmful and have to be removed. It has been found that the lignosulfonate salts to be utilized in the method according to the present invention, may be in the crude form, which is also less expensive than the purified form, without impairing the activity per unit weight of the soil conditioner, but in a water soluble form and most preferably having a molecular weight of not higher than 20,000. Furthermore, experiments with certain materials indicate higher activity per unit weight of a soil conditioner produced from crude lignosulfonate than the purified form; it goes without saying however that purified polysaccharide—free lignosulfonate also often referred to as lignosulfonic acid or lignosulfonate salts, may also be utilized, such as for the protection against wind and water erosion of granulated material to be used in concrete mixtures with portland cement wherein polysaccharides may be harmful.

The graft polymerization between the acrylic acid or methacrylic acid and the lignosulfonate is an exothermic, addition reaction which occurs at a pH in the range of 1.5 to 4 and preferably in the range of 2 to 3.5. The products obtained are stable and even after more than one year of storage, no change in their structure or in the results obtained from their utilization were observed.

The pH is adjusted by the addition of sodium hydroxide solution or sulfuric acid according to the acidity of the reaction mixture. It has been found according to the present invention that the pH has a great influence on the extent of reaction as well as to the composition of the product. In the following Table 1, are enumerated some experiments carried out at different pH and the reaction products are compared:

TABLE I

| | | Influence of pH on the reaction product | | |
|---|---|---|---|---|
| Exp. No. | pH | % of acrylic acid monomer copolymerized with lignosulfonate | Intrinsic viscosity in 0.1 M sol. of NaCl | Remarks |
| 1 | 1.5 | 99.8 | 0.33 | |
| 2 | 2.4 | 99.5 | 0.43 | |
| 3 | 6.1 | 10 | above 1 | Contains large amounts of monomer |
| 4 | 7 | 5 | above 1 | Contains large amounts of monomer |

Whereas at a pH in the range according to the present invention (1.5 to 4) the extent of the reaction between the lignosulfonate and acrylic acid was substantially 100%, at a pH beyond the range the extent of reaction was only 10% and 5% respectively, the products containing large amounts of unreacted monomer. Also the appearance of the products greatly differs: these according to the present invention are true solutions having a relatively low viscosity, whereas these obtained at a different pH range are very viscous. According to the different properties of such products, different uses will be envisaged. Thus for instance, the more viscous substances will be useful for drilling muds where it is required to maintain small particles in suspension and avoid their aggregation. A typical reference can be illustrated by U.S. Pat. No. 3,985,659.

Figure 3:
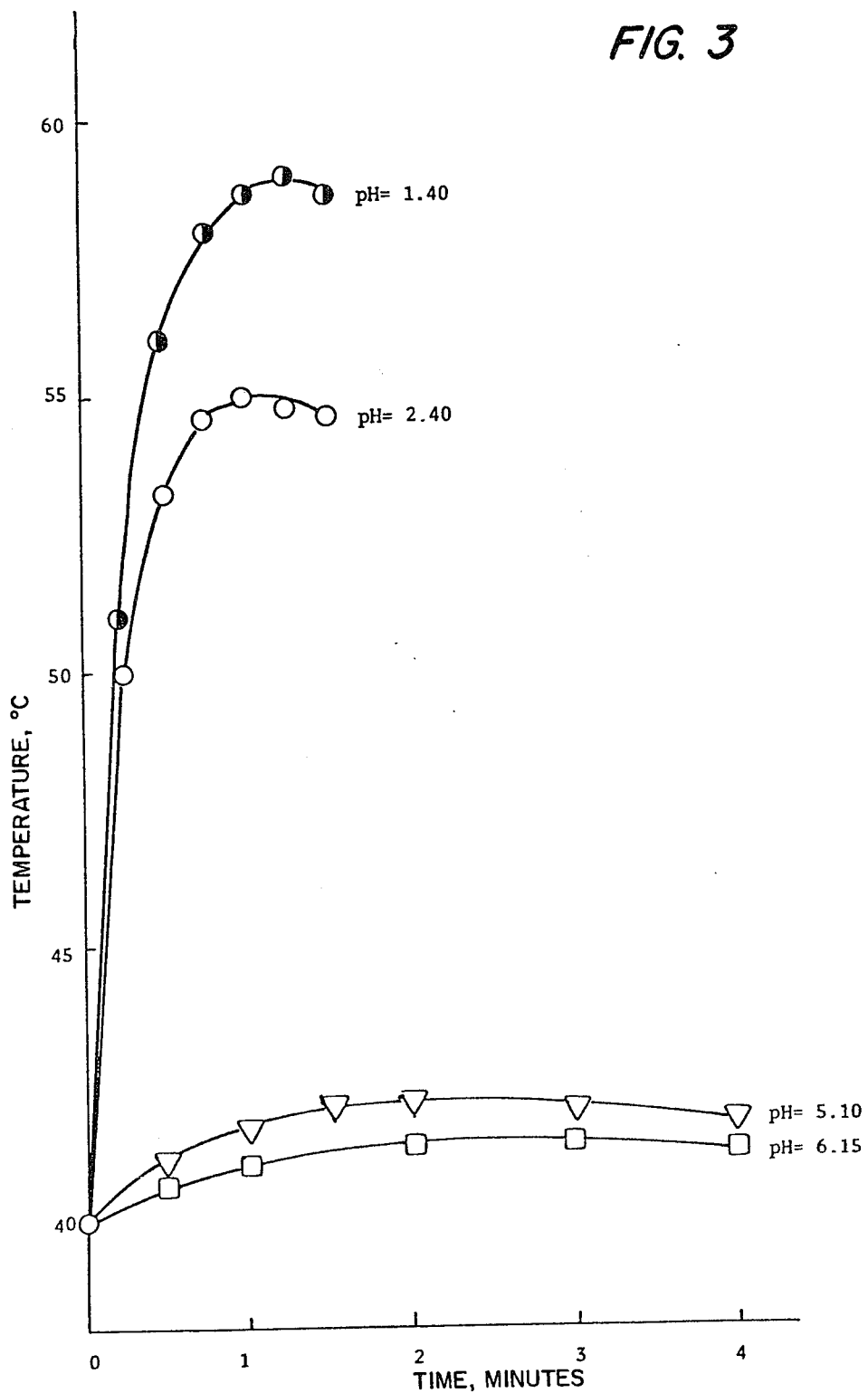

Another very important influence of the pH is on the course of the reaction. It has been found that the pH in the range of 1.5 to 4.0 causes an exothermic reaction between the lignosulfonate and acrylic or methacrylic monomer. This enables to obtain a product substantially free of monomer and also a very quick reaction in the order of 2 to 5 minutes. In FIG. 3 are given graphs on the exothermicity of the reaction carried out at a pH in the range according to the present invention (1.40 and 2.40) and outside this range (5.10 and 6.15). The graphs clearly show that within the range according to the present invention temperatures of about 54° C. (at pH 2.40) and 58° C. (at pH 1.40) are obtained in about 1 minute whereas at pH outside the range claimed, the temperatures reach a value of only about 42° C. even after 4 minutes. All these experiments were carried out at the same conditions of concentration and ratios lignosulfonate to acrylic acid (10% lignosulfonate in water and 1:1 ratio).

The new graft polymers obtained according to the present invention can easily be transformed into a powder form by spray drying. The powder form of the graft polymers is of course the easiest form for handling and transportation since it can easily be diluted to the desired concentration at the end use. This is an important advantage over a graft polymer obtained from an acrylic ester and lignosulfonate, which appears as a highly viscous and thixotropic mass and more costly to be spray dried. Thus for instance the viscosity of a solution of 15% by wt. of graft polymer obtained from methyl acrylate ester and lignosulfonate (1:1) was found to be 10,000 cps (at 20 rpm) at a temperature of 25° C. while under same conditions, the same concentration of 15% by wt. of a graft polymer obtained from acrylic acid and lignosulfonate (1:1) showed only a viscosity of 27 cps. The viscous form of the graft polymer from methyl acrylate ester and lignosulfonate can also be illustrated by the thixotropy measurement which was found to be 5.7% (measured at 0.5 rpm with a viscosity of 17,500 cps). This of course is in contrast to the fluidity of the new graft polymers obtained according to the present invention, which are obtained in the form of true solutions.

The new graft polymers according to the present invention are very useful as soil conditioners in stabilizing aggregates in their acidic form, such as resulting from the reaction. However, they can be neutralized to turn them less corrosive in storage and handling and also less sensitive to water quality. There will be differences in their efficiency for different soils depending on the particle sizes, free solutes in the soil and form of application. Often the efficiency percent by weight of soil conditioner remains the same after neutralization. Whereas the alkaline reagent utilized for the neutralization of the graft polymer is the less expensive component, an overall advantage is thus obtained.

The neutralization can be easily carried out at room temperature, utilizing either strong or weak bases. In the latter case ammonia will be preferred resulting also in a beneficial effect on plants growing. This is in contrast to the saponification with alkali reagents including ammonia suggested with the graft polymers obtained from esters of acrylic acid, which must be performed at high temperature and in pressurised autoclave, which tends to be prohibitively expensive.

The initiator required to be present in the graft polymerization, is selected from known reagents used in this type of reaction e.g. hydrogen peroxide or organic peroxides such as cumene hydro-peroxide. It has been found that benzoyl peroxide which is also a known reagent for this type of reaction is unsuitable for this graft copolymerization. The reason for this phenomenon has not yet been elucidated. It is also possible to initiate the polymerization reaction by purely physical means, such as ultraviolet radiation.

As mentioned above there are known graft polymers of lignosulfonate with acrylic acid, containing high amounts of unreacted acrylic monomers such as described in U.S. Pat. No. 3,985,659. These graft polymers which appear as viscous liquids, belong to the thixotropic system and are useful as components in drilling fluids. They are completely unsuitable as stabilizers of aggregates, their purpose being to increase the viscosity and avoiding settling of the components in the drilling mud.

Compared with the graft polymers based on acrylic esters and lignosulfonate followed by saponification, suggested as structure formers by the above mentioned Russian Pat. No. 492,261, the new graft polymers according to the present invention are much superior as soil conditioners in stabilizing aggregates being characterised by the following advantages:

1. Due to their low viscosity and high fluidity they are produced at a higher concentration in smaller volume utensils with less energy. They can be utilized at higher concentrations with easy handling, which of course will also save storage and transportation costs. Their low viscosity and high fluidity also increase the shelf life of the graft polymers.
2. They do not require saponification wherein strong alkaline solutions and high temperatures and pressures have to be utilized, and thus are more economical to be produced.
3. In special cases where partial or complete neutralization may be desirable for certain types of soils, this can be performed by using weak and inexpensive alkaline solution such as ammonium hydroxide as well as strong alkalies at ambient temperatures and atmospheric pressure.
4. They can be easily and much more economically transformed into a powder by spray-drier than the acrylate ester-based graft polymers. The latter can be spray dried only after high dilution of the viscous mass (not more than 20% by wt compared of about 40% and more by wt of acrylic acid-based graft polymers), which means that much more energy would be required for their water content evaporation.
5. No deleterious or harmful components are present in the conditioner in contrast to the methyl alcohol generated at about 13% concentration by the hydrolysis of the methyl acrylate-based graft polymers (1:1 weight ratio to lignosulfonate).

Compared with the known polyelectrolytes based on acrylonitrile copolymers, as described in the prior art, the new graft polymers according to the present invention are claimed to be much superior as soil conditioners being characterized by the following improved properties:

1. They have a long shelf life without special storage precautions such as dry atmosphere, darkness or oxygen-free atmosphere.
2. The molecular weight of the graft polymer according to the present invention is reduced and therefore the number of effective bonds per unit weight of soil conditioner is increased facilitating a more uniform spreading of the conditioner through the soil.
3. The graft polymer is more soluble and thus less sensitive to possible further polymerization or setting with time.

4. The bonds formed between the graft polymer and the soil are strong enough for maintaining an aggregate of the proper magnitude, but not too strong so as to cause the formation of large soil clods or too strong clods or not sufficiently permeable to permit adequate movement of water, air and nutrients into the soil treated.
5. The bonds formed are at least partially regenerative, which means that the aggregate property of the soil persists even after several cycles of rain, drying and working of the soil.
6. The graft polymers are water soluble which can be easily transferred and diluted.
7. The graft polymers are not sensitive to solutions of many electrolytes even at high concentrations which enable use of water of various qualities.
8. They are practically nontoxic.
9. Most of them can be diluted to any extent and sprayed without problems of clogging the nozzles or pipes.
10. The properties of the graft polymers may be changed by varying the proportions between the acrylic or methacrylic monomer and lignosulfonate in order to provide the best result for soil conditioning according to the goal desired to be achieved.

Concerning the production of the new graft polymers, the process involved is characterized by the following advantages:

1. The main component, lignosulfonate, is a low cost raw material which today is an environmental burden.
2. The process does not require the removal of the inhibitors from the monomers, as generally encountered in graft polymerization.
3. The reaction is exothermic and occurs at ambient temperatures and at atmospheric pressure. Generally the reaction time is about 5 minutes at a temperature of between 30° to 95° C.
4. The polymerization of the monomers is almost complete leaving only traces of monomer which may be left in the end product.
5. Tap water or even with a higher salt content may be utilized. In this respect emulsions obtained in the synthesis with esters of acrylic acid are more sensitive to cleaniness of the system than the solution obtained according to the present invention.

The application of the graft polymers prepared in accordance with the present invention as soil conditioners can be done by the known methods. When used in the solid form, it can be mixed with the soil or spread mechanically, watering and if necessary reworking the mixture. When used as an aqueous solution, the soil conditioner is simply mixed with the wet soil. The soil conditioner may also be applied together with the irrigation water. The amount of soil conditioner to be given will vary from soil to soil in accordance with the goal envisaged; thus, for example, for a loess-type soil, improved results in the structure, such as increased aggregation, were obtained by using between 0.025% and 0.1% by wt of the soil. Higher amounts of soil conditioner, up to 0.2% by wt (on a dry basis) will further increase the proportion of stable aggregates, but this will generally not be economically attractive. For soil strengthening in construction work however, higher amounts may be recommended.

A preferred method for the application of the new graft polymers as soil conditioner, which is much simpler than the above known ways, is by spraying the aqueous solution directly on the soil. This method of application for soil conditioning has become possible, thanks to the particular properties of the copolymer obtained according to the present invention.

It has been found that the conditioner sprayed on to the soil forms a protective layer which prevents aggregate breakage by action of raindrops or wind erosion. The rate of water infiltration into the soil is maintained, preventing the formation of an impermeable crust by the impact of raindrops. It also improves the regeneration of infiltration capacity after drying and thus helps in the germination of seeds.

It has been found that by repeated spraying, drying and shallow cultivation, an excellent protective mulch layer is produced which is well aerated, reduces the evaporation from the soil and thus retains the water, and leads to markedly improved crop yields. This has a special importance where crust formation by raindrop puddling is detrimental and water supply is limited.

Instead of using pure aqueous solutions, the graft polymer solution obtained according to the present invention, may be sprayed admixed with an aqueous fertilizer such as ammonia solution. In this manner the incorporation of the soil conditioner is carried out at the same time as the fertilizer application, thus saving additionally an agrotechnical operation. In a similar manner it is also possible to incorporate the soil conditioner in various pesticides or herbicides and apply to the soil together with these.

According to another embodiment of the present invention, the soil conditioning apparatus can be mounted on various soil working implements and especially on the planting machines. This apparatus consists of devices for spreading the graft polymer either in powder form or preferably in an aqueous solution on to the soil. The soil with which the seeds are covered will already contain the conditioner reagent and thus will retain good water infiltration and good aeration prospects even after hevy rains or irrigation. This combined operation of simultaneous planting and soil stabilization can be carried out by the simple addition of the appropriate nozzles in front of, besides or behind the planting tool. Generally speaking, the amount of soil conditioner needed for surface spraying or along with the planting medium is about 20 to 50 kg. per hectare of soil. Larger amounts can be used with better results. However, these are less attractive from an economical point of view. Thus for example a tenfold amount and even more will be necessary for mixing in a plow layer. It has been found that the application of the new graft polymer as soil conditioners can also be carried out on an area of limited extent in strips or on patches of soil. Better results are obtained with larger water dilution and in soil which is already humid prior to the application of the soil conditioner.

The outstanding results of soil conditioning obtained with the graft polymers according to the present invention, were substantiated both in laboratory and in field tests, and much better results as regards the stability of aggregates than those obtained with a known acrylic polymer (manufactured and marketed by Monsanto under the Trade mark of "Krylium") or with crude lignosulfonate were achieved. It was found that the beneficial effect of the new soil conditioners on aggregate formation appears even with a very low percentage of graft polymer produced according to the present invention.

FIG. 1 illustrates in graphic form the percentage of stable aggregates larger than 0.1 mm (by wet sieving) in a loess type soil obtained, as a function of the percentage (by wt) of conditioner used. For comparison, corresponding tests were performed with crude lignosulfonate—given in Graph 1—and with the same "Krylium" given in Graph 2. The improved results of the new soil conditioner are self-evident. Whereas with an amount of 0.075% by wt. lignosulfonate or Krylium, the stable aggregates were 37% and 45% respectively, the stable aggregates were 60% and 72% (Graphs 3, 4) when using the same amount of conditioner prepared according to the present invention. In Graph 3 the soil conditioner consists of a graft polymer 0.6 parts acrylic acid, 1 part lignosulfonate (40% by wt. concentration in water) while in Graph 4—it consists of 1 part acrylic acid and 1 part lignosulfonate (25% by wt. concentration in water).

Figure 2:
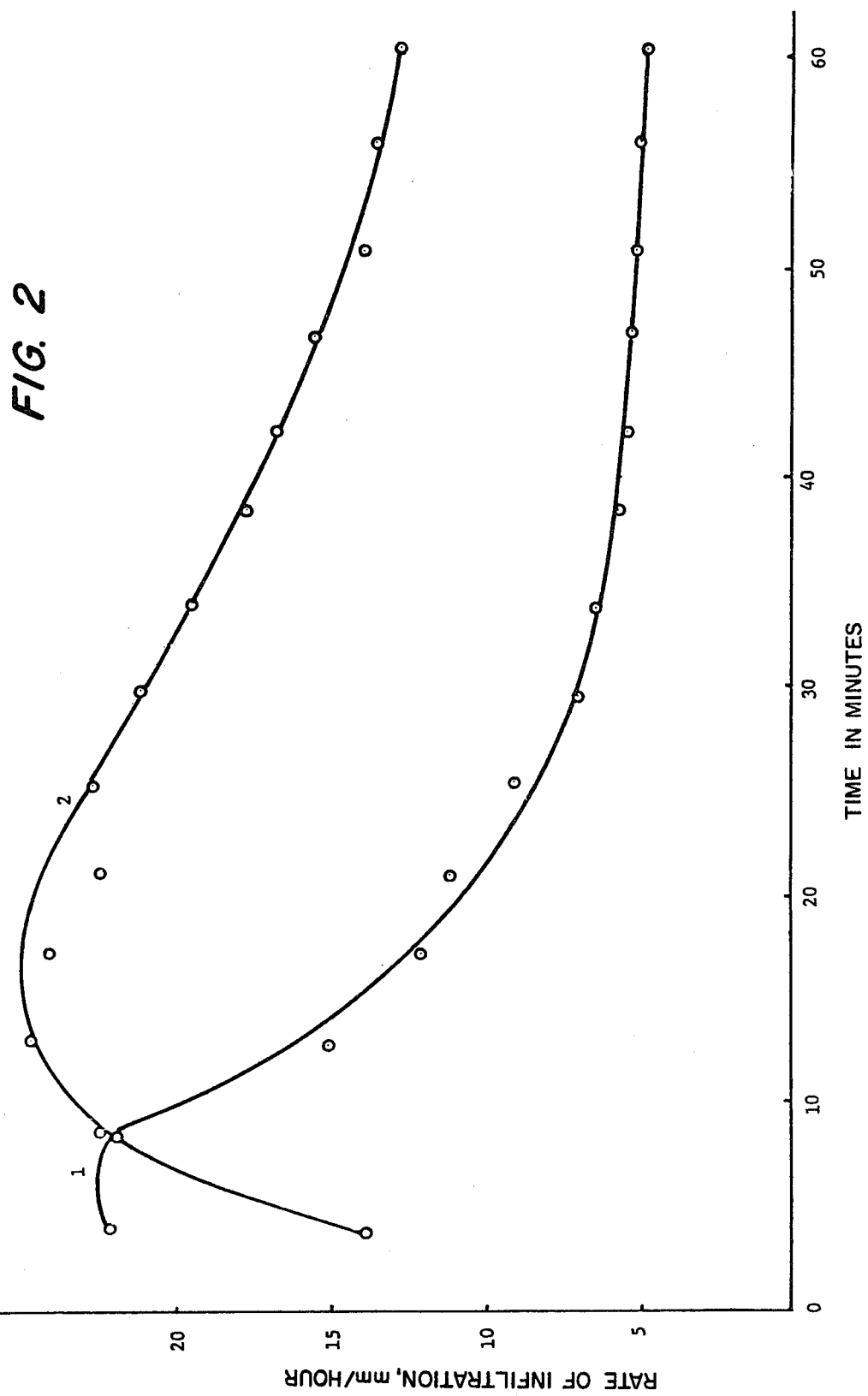

FIG. 2 illustrates the influence of rain on rate of infiltration in a loess soil type, measured on rain intensity of 60 mm/hr. It appears that with untreated loess (Graph 1) the rate of infiltration decreases from 22 mm/hr. to 6.8 mm/hr. after 30 minutes. With a loess spread with 1 mm depth of a solution of 0.3% by wt conditioner (prepared according to the present invention), the rate of infiltration after 30 minutes decreases only to 21 mm/hr. (Graph 2). Another beneficial effect which has been found is that after the loess drying, the infiltration capacity is regenerated.

Wet sieving tests of soil aggregates were carried out on a calcareous clay soil (40% CaCO$_3$ and 50% clay) from Maos Haim (in the Jordan Valley) treated with the new graft polymer (prepared as described in Example 2 hereinafter). As known serious structural problems concerning aggregates formation in the size range of 0.1-2 mm are encountered in such calcareous soil. The results obtained are given in the following Table II:

TABLE II

| Ord. No. | % of soil conditioner utilized / Size of aggregates | 0 | 0.025% | 0.050% | 0.075% | 0.1% | 0.2% |
|---|---|---|---|---|---|---|---|
| | | | | | % of aggregates | | |
| 1 | Larger than 2 mm | 4.23 | 12.38 | 14.98 | 20.16 | 21.16 | 30.40 |
| 2. | From 1 mm to 2 mm | 13.75 | 14.74 | 16.97 | 18.21 | 20.36 | 27.01 |
| 3. | From 0.5 mm to 1 mm | 18.94 | 19.86 | 20.31 | 21.65 | 21.47 | 23.07 |
| 4. | Total larger than 0.5 mm | 36.92 | 46.95 | 52.26 | 60.02 | 63.43 | 80.48 |
| 5. | From 0.25 mm to 0.5 mm | 22.53 | 21.90 | 21.52 | 17.89 | 19.47 | 13.10 |
| 6. | From 0.1 mm to 0.25 mm | 24.90 | 18.97 | 17.64 | 13.38 | 12.12 | 6.42 |
| 7. | Total larger than 0.1 mm | 84.35 | 87.85 | 91.42 | 91.29 | 95.02 | 100.0 |

From the above Table one can see that the total of aggregates larger than 0.1 mm (No. 7) increase by about 15% (from 84.35 to 100.0) at a level of 0.2% soil conditioner. At first sight this seems a rather small effect; however, excluding the aggregate size of 0.1–0.5 mm, the increase is about 43.5%. This indicates that the strength of the bonds formed by the soil conditioner is optimal. It fits exactly for formation of aggregates larger than 0.5 mm but below 2 mm size.

The new graft polymers obtained according to the present invention possessing the fundamental polyelectrolytic properties, may also be useful for various other purposes, such as animal feed pelletizers, leather tanning, sequestering agents of metallic ions and preventing turbidity due to mud suspensions in fish ponds. It can also be utilized in water treatment to get out suspended solids. Of special interest is the agglomeration of particulate raw materials thus avoiding dust formation by wind erosion. This will therefore solve environmental problems of dust and pollution from storage, transportation and handling of various particulate materials such as coal, sulfur, chalk, rock phosphate etc. Addition of the new graft polymers to calcium hydroxide dispersion (milk of lime) during or after its formation will prevent spearing off the dried fine material. For improving the soil structure, the new graft polymers can produce larger aggregates which will be less likely to be eroded in pipes. Furthermore, it will trap very fine clay particles that will move through the soil.

In order further and more fully to illustrate the nature of this invention and the manner of practising it, the following Examples are presented for clearness of understanding only and no limitation should be understood therefrom. The amounts used are expressed in parts by weight unless otherwise stated.

EXAMPLE 1

100 parts of crude lignosulfonate (containing polysaccharides as obtained from the paper industry) were introduced into a reactor (provided with a stirrer, a thermometer and a condenser) together with 150 parts of tap water. Subsequently 60 parts of acrylic acid were added; the pH being adjusted by a sodium hydroxide solution (20%) to 2.5 and the mixture heated to about 30° C. Then 2 parts of hydrogen peroxide (10% by volume) were added and an exothermic reaction was observed, the temperature reaching 75° C. The reaction was kept going at this temperature for 5 minutes and further heated and kept at 95° C. for 10 minutes to ensure the completion of the reaction. The product appeared in the form of a brown solution and was very useful as a soil conditioner for alkali soils and for stabilization of sand against wind erosion. The beneficial results in the formation of stable aggregates, appear in Graph 3 (FIG. 1).

EXAMPLE 2

In this Example 100 parts of crude lignosulfonate were mixed with 300 parts of tap water in a similar manner as in the previous Example and heated at about 30° C. with 100 parts of acrylic acid in the presence of 2 parts cumene hydroperoxide, the pH being adjusted to 2.5 as in Example 1. An exothermic reaction was observed the temperature reaching about 80° C. To ensure the end of the polymerization the reaction was kept going at 95° C. for ten minutes. The brown solution was neutralized with 92 parts of an aqueous solution of NH4OH (25% by wt), the pH of the product obtained being about 6.5. It was very useful as a soil conditioner for most soils, as appears in the formation of stable aggregates in Graph 4 of FIG. 1. It was also tested on the influence of rain on rate of infiltration in a loess soil type, the beneficial results are presented in Graph 2 of FIG. 2.

EXAMPLE 3

The preparation as described in Example 1 was repeated using the same crude lignosulfonate at the same concentration with 40 parts acrylic acid and 0.2 parts of cumene hydroperoxide as initiator. The other reaction conditions were the same as in Example 1. The aqueous solution obtained was very useful as soil conditioner, especially admixed with an alkaline fertilizer such as ammonia and sprayed onto the soil.

EXAMPLE 4

The preparation as described in Example 1 was repeated using the same crude lignosulfonate at the same concentration, with 60 parts methacrylic acid and 2 parts hydrogen peroxide (10% by volume) and heated to about 40° C. Due to the exothermicity of the reaction, the temperature of the reaction mixture reached 65° C. After the reaction was kept going for about 5 minutes at this temperature, it was further heated at 95° C. and kept for 10 minutes to ensure the complete consumption of the methacrylic acid. The product was a brown solution and was useful as a soil conditioner for sandy soils.

EXAMPLE 5

The preparation as described in Example 2 was repeated using the same crude lignosulfonate (100 parts) at the same concentration and heated with 100 parts methacrylic acid at 35° C. in the presence of 2 parts H2O2 (10% by volume). Due to the exothermicity of the reaction, the temperature of the reaction mixture reached 75° C. After the reaction was kept going for about 5 minutes at this temperature, it was further heated at 95° C. and kept for 10 minutes to ensure the complete consumption of the metacrylic acid. The product obtained was less fluid than that obtained in the previous Example. It was very useful in stable aggregates formation in particular for alkaline soils. If desired, it can easily be neutralized with an ammonia solution (20%) and thus can be utilized also on neutral and acidic soils.

EXAMPLE 6

The preparation as described in the previous Example was repeated using 100 parts crude lignosulfonate, 300 parts tap water with 50 parts acrylic acid and 50 parts methacrylic acid. The reaction was performed in the presence of 2 parts H2O2 (10% by volume). Due to the exothermicity of the reaction, the temperature of the reaction mixture reached 70° C. After 5 minutes at this temperature, it was heated at 95° C. for further 10 minutes to ensure a complete reaction of the acrylic and methacrylic acid components.

EXAMPLE 7

Heaps of phosphate rock (−20 mesh size, Tyler scale) were sprayed by an aqueous solution containing 5 g/l of the graft polymer prepared according to Example 2, at a rate of 1 l/square meter. After drying, the heaps were subjected to wind erosion in a wind tunnel and it was found that erosion started only when the wind had a velocity of 60 Km/hr. A comparative test carried out with water alone showed that at the same water rate spraying, the erosion began already when the wind had a velocity of 25 Km/hr.

EXAMPLE 8

The previous Example was repeated with heaps of coal (−4 mesh size, Tyler scale) sprayed with the same reagent and rate as before. The same improved results against wind erosion were noticed.

A comparative qualitative test showed that the coal treated only with water was dusty on handling.

EXAMPLE 9

A marly soil (from the Jordan Valley) was sprayed with a solution of 5% by wt of the graft polymer obtained in Example 2, using various rates of solution. An improved crust was obtained at a rate of 400 g graft polymer per square meter. The crust was stable and withstood wind tunnel test at a wind velocity of 60 Km/hr. A comparative test with water showed that the crust was stable only at a wind velocity of 30 Km/hr.

We claim:

1. Graft polymers obtained by the exothermic reaction of lignosulfonate with a member selected from the group consisting of acrylic acid, methacrylic acid and mixtures thereof at a pH between 1.5 to 4 in the presence of an initiator, said polymers being substantially free of monomer and having an intrinsic viscosity below 1 dg/l and molecular weight lower than 100,000.

2. Graft polymers obtained according to claim 1, wherein the weight ratio between the components is up to 8 parts lignosulfonate to one part acrylic acid or methacrylic acid.

3. Graft polymers obtained according to claim 1, wherein the initiator used is of the peroxide type.

4. Graft polymers obtained according to claim 3, wherein the peroxide used is selected from the group consisting of hydrogen peroxide and cumene hydroperoxide.

5. Graft polymers obtained according to claim 1, wherein the lignosulfonate utilized is substantially free of polysaccharides.

6. Graft polymers obtained by the exothermic reaction of lignosulfonate with a member selected from the group consisting of acrylic acid, methacrylic acid and mixtures thereof at a pH between 1.5 to 4 in the presence of an initiator and subsequently neutralized by an alkali.

7. Graft polymers according to claim 6 wherein a partial or complete neutralization is performed by an aqueous alkaline solution selected from the group consisting of NaOH and NH4OH.

8. Graft polymers according to claim 1, obtained in a powder form by spray drying.

9. Graft polymers according to claim 1, wherein the weight ratios between the components are in the range of between 1 part lignosulfonate to 0.4 part acrylic or methacrylic acid and 1 part lignosulfonate to 2 parts acrylic acid or methacrylic acid.

* * * * *